Figure 1:
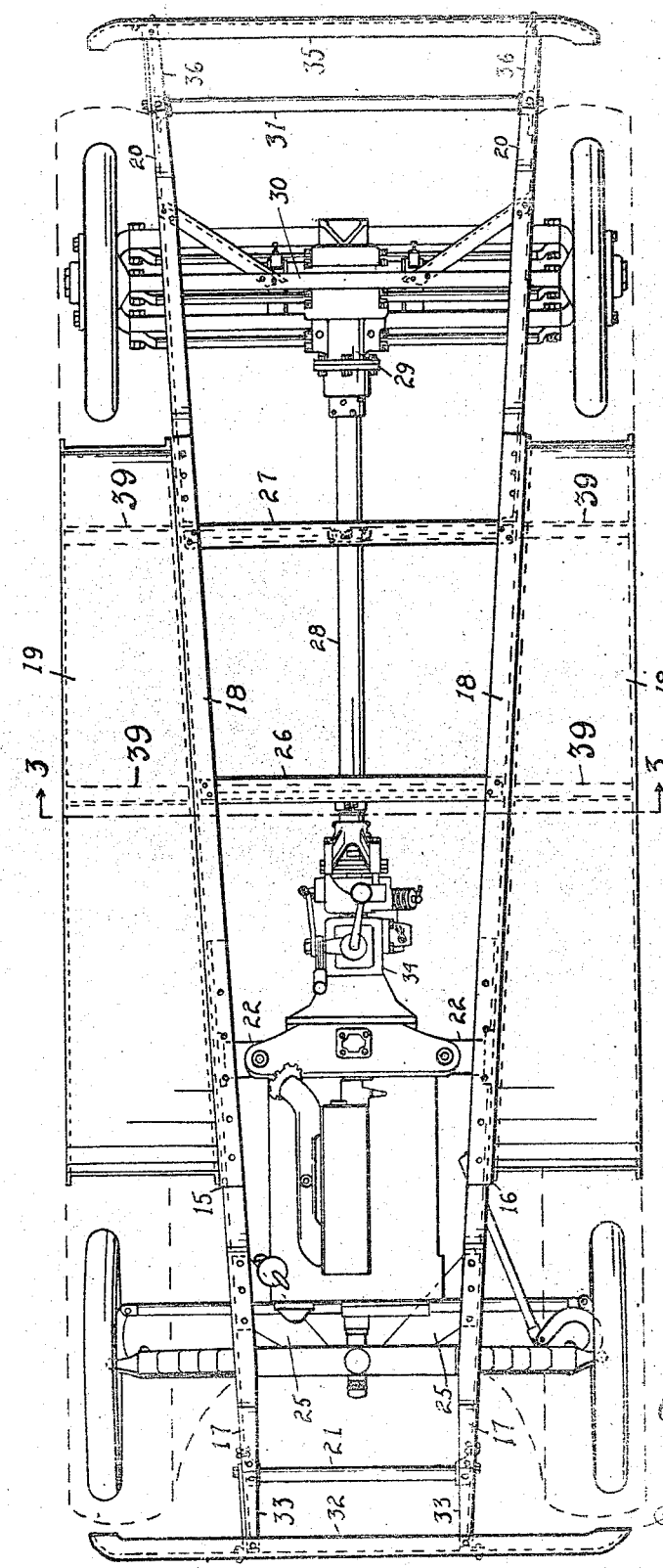

C. E. WEAVER.
AUTOMOBILE FRAME.
APPLICATION FILED JUNE 16, 1921.

1,435,354.

Patented Nov. 14, 1922.
3 SHEETS—SHEET 1.

Inventor

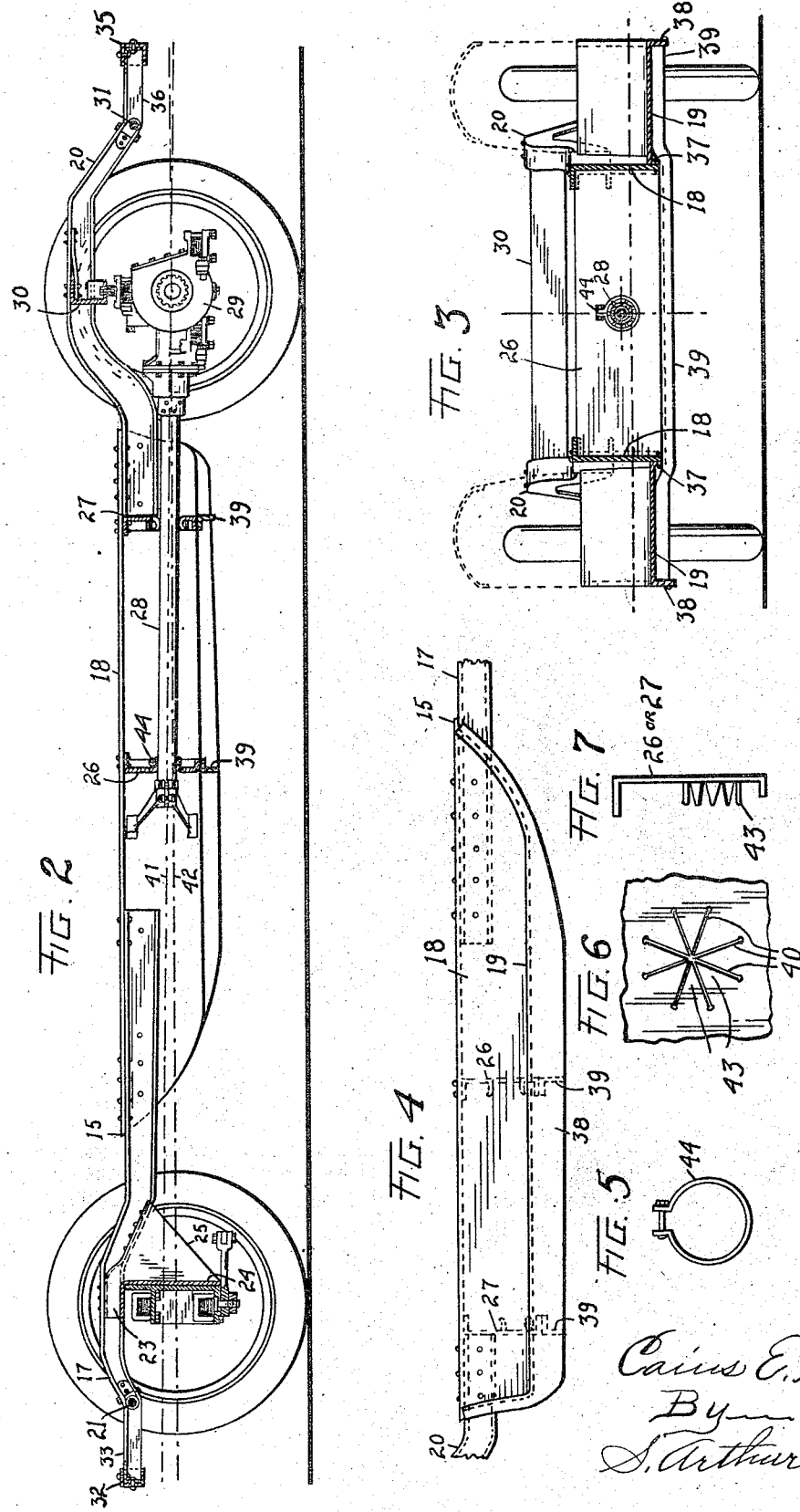

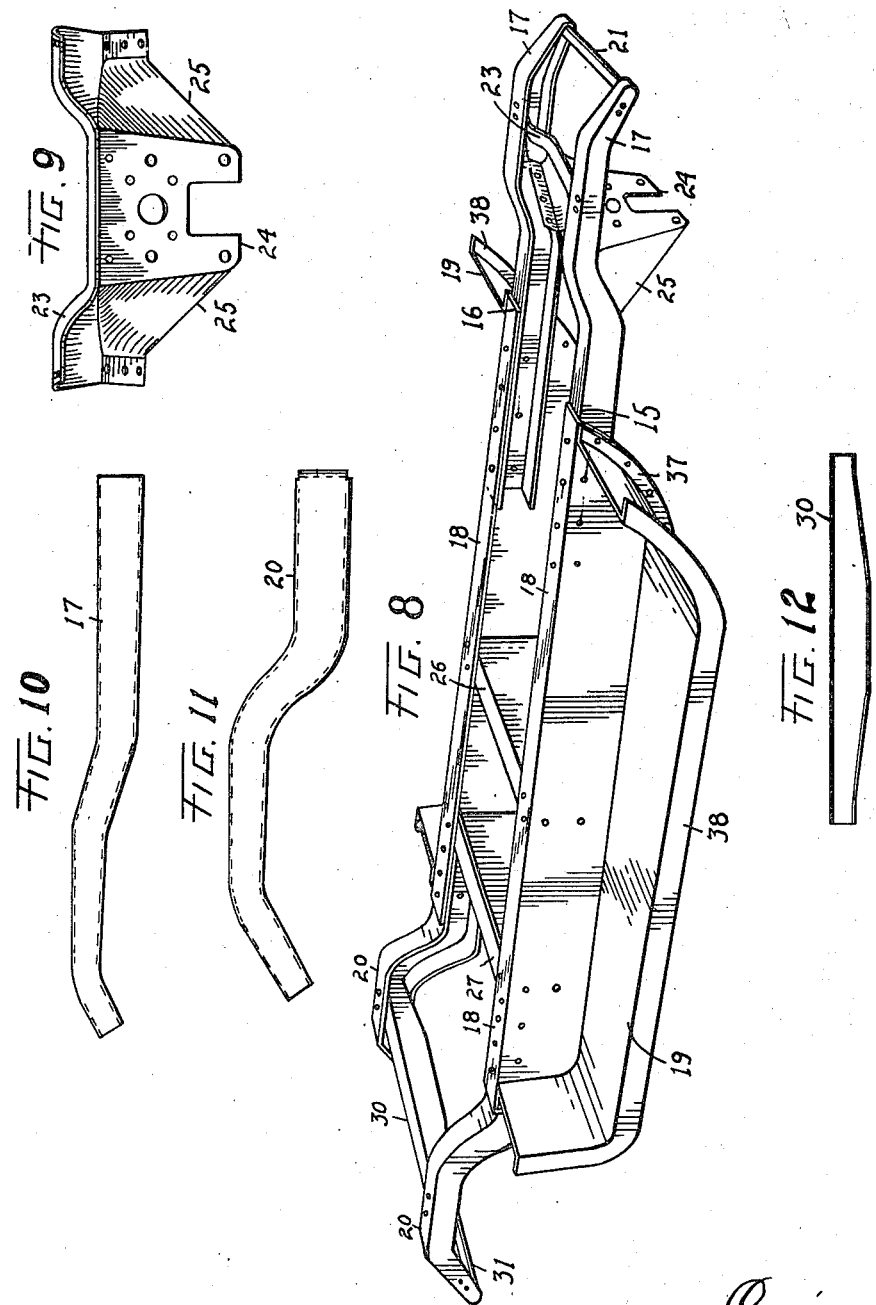

Patented Nov. 14, 1922.

1,435,354

UNITED STATES PATENT OFFICE.

CAIUS E. WEAVER, OF SYRACUSE, NEW YORK, ASSIGNOR TO BIRMINGHAM MOTORS, A TRUST, OF JAMESTOWN, NEW YORK.

AUTOMOBILE FRAME.

Application filed June 16, 1921. Serial No. 477,996.

*To all whom it may concern:*

Be it known that I, CAIUS E. WEAVER, a citizen of the United States, residing at the city of Syracuse, in the county of Onondaga and State of New York, have invented certain new and useful Improvements in Automobile Frames, of which the following, taken in connection with the accompanying drawings, is a specification.

The invention relates to the frames of automobiles and similar vehicles; and the improvement consists, first, in providing a rigid frame constructed of angular and channel-shaped sheet metal lengthwise and crosswise members in which said lengthwise members comprise three-part side rails which are supported in tapering relation to one another from the rear toward the front; and second, to construct said automobile frame so that it may be made in three sub-assemblies, the front sub-assembly including the front portions of said side rails connected by the crossrails and the motor and transmission, the central sub-assembly including the side aprons and the running boards attached thereto and the central crossrails and the torque tube and propeller shaft supported therein, the rear sub-assembly including the rear portions of the side rails and the connective cross members and the differential casing rigidly attached thereto and to said torque tube. This arrangement permits the running boards, side aprons and a part of the fenders being assembled as a part of and reinforcement for the frame, thereby giving great rigidity and strength thereto, and permitting a large reduction in weight, as well as holding the drive line or propeller shaft in alinement, and eliminating the tendency in said frame to weave or twist, also permitting said three sub-assemblies to be constructed independent of one another and then assembled into the complete automobile frame and chassis; and the invention consists in the novel features and combinations hereinafter set forth and claimed.

In the drawings, Figure 1 is a top plan view of the chassis of an automobile, showing the automobile frame attached upon the axle assemblages of said chassis. Fig. 2 is a lengthwise sectional view of said chassis with the motor and transmission removed, showing the preferred construction and arrangement of the different parts of the automobile frame and its relation to the front and rear axle assemblages and the torque tube. Fig. 3 is a crosswise sectional view of said frame at line 3—3 in Fig. 1 showing the torque tube and drive line rigidly supported in a crosswise member of the frame, and the preferred construction and arrangement of the frame and running boards at each side. Fig. 4 is a side elevation of the running board and apron showing the manner in which the front and rear lengthwise side rails are assembled into said apron. Fig. 5 is a plan view of one of the clamping rings for the torque tube; and Fig. 6 is a plan view of the radial cuts in the crosswise member of the frame for attaching the torque tube; and Fig. 7 is an endwise view of the crosswise member showing the triangular shaped clamping lugs formed by said cuts and extending at right angles from said crosswise member to receive the clamping ring shown in Fig. 5 around the same to rigidly clamp and hold the torque tube therein. Fig. 8 is a perspective view of the automobile frame showing the preferred construction and arrangement of the same. Fig. 9 is a perspective view of the front cross member, with its downwardly projecting gussets and apron for attachment to the frame and front axle assembly. Fig. 10 is an outer side elevation of one of the front side rails; and Fig. 11 shows a similar view of one of the rear side rails. Fig. 12 is an elevation of the crosswise channel-shaped cross bar member of the frame over the rear axle differential assembly.

Like characters of reference refer to corresponding parts in the several views.

The automobile frame consists of two three-part side rails 15 and 16 which taper forwardly in their relation one to the other, and the crosswise connections for said rails.

The three parts of said side rails 15 and 16 comprise the front side rail portions 17, the central aprons 18 with the running boards 19 attached thereto, and the rear side rail portions 20. Said front and rear side rail portions 17 and 19 are preferably made in the channel-shaped form with the channel turned inward and are bent upward to accommodate the front and rear axle assemblies. The aprons 18 are preferably made in the inverted L-shape form in cross section so that the front and rear side rail portions may be assembled into the same by riveting or other rigid attachment thereto.

The different portions of the side rails 15 and 16 are connected to one another in the following manner: The front side rail portions 17 are connected by the tubular front cross rail 21 which is rigidly attached within the channel sides of said front rail side portions 17, and also by the front cross rail 23 with its downwardly projecting apron 24 and the gussets 25 at each side which extend into said open sides of the front side rail portion 17, the entire cross rail 23 with its apron 24 and gussets 25 being preferably struck from the sheet metal in the form shown in Figs. 2, 8 and 9. The front downwardly projecting apron 24 is placed at a forward angle to assist in taking the shocks from obstacles encountered by the front wheels, and to thereby aid in overcoming any tendency of the frame to weave forward. The motor supporting brackets 22 attached within the open channel sides of the rear portions of said front side rail portions 17 form the third crosswise connecting member for the side rails 15 and 16 as shown in Fig. 1 when the motor is attached to said brackets 22.

The side aprons 18 of the central subassembly have the crosswise channel-shaped connecting bars 26 and 27, that is, they have flanges on their upper and lower edges as well as upon their end portions, by means of which they are attached to the aprons 18. The torque tube 28 is rigidly yet removably supported central of said cross bars 26 and 27, as well as to the transmission casing 34 at its front end, and to the differential casing 29 at its rear end, as hereinafter described.

The rear sub-assembly consists of the two channel-shaped side rail portions 20 which are connected over the differential casing 29 by the crosswise channel-shaped bar 30 which is braced by suitable gussets extending rearwardly and into the open channel sides of said rear side rail members 20. The rear portions 20 of the gradually widening side rails 15 and 16 are further connected by a rear tubular rod 31 which strengthens and braces said rear ends, holding them firmly in position. Suitable brackets are provided within the channel-shaped ends of said side rail portions 20 to support the tubular cross rod 31 firmly in position and give added rigidity to said frame.

A front bumper 32 is attached to the front ends of the front side rails 15 and 16 by means of short stub rails 33 at each side which are attached to the brackets holding said tubular cross rod 30. This arrangement is preferable as it is desired that the side rails 15 and 16 should bend at the point of attachment for said stub rails 33 rather than to buckle or bend the side rails 15 and 16 in the rear of the front axle alongside the motor. A rear bumper 35 is attached by means of stub rails 36 at each side in much the same manner as the front bumper 32, by attachment to the holding brackets for the tubular cross rail 31.

The running boards 19 are made a part of the frame, stiffening and strengthening the three-part side rails 15 and 16, being preferably formed with inner and outer downwardly turned flanges. The inner downwardly turned flanges 37 at each side are firmly attached by riveting or spot welding to the aprons 17 and 18 along their lower edges, the ends of said running boards being turned upwardly for the attachment of the fenders or mud guards thereto which extend over the wheels. The outer downwardly turned flanges 38 extend the full length of the running boards 19 and 20 and are of sufficient width to greatly strengthen and stiffen the said running boards.

Under each of the cross members 25 and 26 an angular cross bar 39 is attached to the lower flange of said cross members 25 and 26, which cross bars 39 greatly stiffen and strengthen said cross members and extend upward and outward beneath the aprons 17 and 18 and running boards 19 and 20, preferably bracing against the inner side of the outer flange 38, thereby greatly stiffening and strengthening said running boards with a minimum addition of weight thereto. The running boards 19 and 20 and bracing cross bars 39 greatly stiffen and strengthen the entire central assemblage so that when the front side rails 15 and 16 and rear side rails 21 and 22 are assembled into the same, as hereinbefore described, the entire automobile frame is rigidly held in alinement so that the tendency to weave or twist is practically eliminated.

The torque tube 27 is removably attached in the openings in central cross members 25 and 26, which openings are made by means of cuts 40 which extend radially from the central axis line desired for the torque tube 27, which axis line is slightly above the horizontal, being preferably at about an angle of one and seven-tenths degrees from the horizontal as shown at 41 in Fig. 2, the horizontal line 42 showing the upward inclination forward of the axis of the rear axle. The cuts 40 shape the pointed clamping members 43 when turned into alinement around the torque tube 28 and a clamping ring 44 is fastened around the torque tube, and clamping members or fingers 43 rigidly yet removably hold the torque tube 28 and make it a portion of the automobile frame.

What is claimed as new is:

1. In an automobile frame, side rails composed of central members of inverted L-shape, and front and rear members each of channel shape secured to and beneath the top flanges of the central members and abutting the inner vertical faces of the latter, running boards of inverted U-shape having their inner flanges abutting and secured to the outer vertical faces of the central members, and cross members engaged with the lower edges of the central members and inner flanges of the running boards and having upturned outer end parts which engage the under faces of the running boards and end faces which abut the inner faces of the outer flanges of the running boards.

2. In an automobile frame, side rails composed of central members, rear members and channel shaped front members, and a cross rail having ends secured within the channels of the front members and having a depending apron and lateral gussets, the latter extending within and secured to the lower flanges of the channels of the front members.

3. In an automobile frame, side rails composed of central members of inverted L-shape, and front and rear members secured to the central member, running boards of inverted U-shape having their inner flanges secured to the lower parts of the central members, and cross members engaged with the lower edges of the central members and the lower edges of the inner flanges of the running boards and having upturned end parts engaged with the under faces of the running boards, the end faces of the cross members abutting the inner faces of the outer flanges of the running boards.

4. In an automobile frame, side rails including inverted L-shaped central members and channel-shaped front and rear members, the front and rear members being secured to the inner faces of the central members and to the inner face of the horizontal flanges of the central members, spaced transverse supports having top flanges secured to the horizontal flanges of the central members and cross members engaged with the bottoms of the central members and with the bottoms of the transverse supports.

5. In an automobile frame, side rails including central rear and front members, engine securing means secured at its ends to each of the front members, differential securing means secured at its ends to each of the rear members, a torque tube receiving the drive shaft, means to secure the front end of the tube to the transmission casing, means to secure the rear end of the tube to the differential casing, and cross supports between the two casings for securing the tube to the central members at points between the transmission and differential.

6. In an automobile frame, side rails composed of central members of inverted L-shape, and front and rear members secured to the inner vertical and horizontal faces of the central members, inverted U-shaped running boards having their inner flanges secured to the central members, cross members engaged with the lower edges of the central members and the inner flanges of the running boards and having upturned ends engaging the bottoms of the running boards and abutting the outer flanges of the latter, and cross members for the central members having upper parts engaged beneath the horizontal flanges of the central members and lower parts seated on the first cross members.

7. In an automobile frame, side rails composed of central members having top flanges, and front and rear members secured to the inner vertical faces of the central members and having top flanges secured to the under faces of the top flanges of the central members, spaced transverse supports having top flanges secured to the top flanges of the central members, and cross members engaged with the bottoms of the central members and with the bottoms of the transverse supports.

8. In an automobile frame, side rails including central members having top flanges and channel shaped front and rear members attached to the central members and to the top flanges thereof, cross members secured at their ends in the outer ends of the channels of the front and rear members, other cross members secured at their ends in the channels of the front and rear members, and cross members having flanges secured to the top flanges of the central members.

9. In an automobile frame, side rails including central members having top flanges, front and rear members connected to the central members, cross members connected to the front and rear members, cross members having top flanges secured to the top flanges of the central members, running boards secured to the central members, and cross members secured to the central members and running boards and supporting the lower sides of the cross members having the top flanges.

10. In an automobile frame, side rails, running boards attached to the side rails, cross members for the side rails secured at their ends thereto, and cross members secured to the bottom sides of the side rails and of the running boards and engaging and supporting the lower sides of the first named cross members.

11. In an automobile frame, side rails having central parts formed with top flanges, cross members for said central parts having top flanges secured to the top flanges of the central parts of the side rails, running boards secured to said side rails, and cross members engaged with the bottoms of the side rails and with the running boards and with the bottoms of the first named cross members to support the latter.

In testimony whereof I have affixed my signature in the presence of two witnesses.

CAIUS E. WEAVER.

Witnesses:
 THEO. THOMAS HAAG,
 CORINNE V. SWANSON.